US008196241B2

(12) United States Patent
Balonick et al.

(10) Patent No.: US 8,196,241 B2

(45) Date of Patent: Jun. 12, 2012

(54) PRESSURE REDUCTION HEALTHCARE MATTRESS SYSTEM

(75) Inventors: Arnold Balonick, Encino, CA (US); Curtis Wyatt, Corona, CA (US)

(73) Assignee: BG Industries, LLC., Northridge, CA (US)

(*) Notice: Subject to any disclaimer, the term of this patent is extended or adjusted under 35 U.S.C. 154(b) by 21 days.

(21) Appl. No.: 12/162,346

(22) PCT Filed: Jan. 31, 2007 (Under 37 CFR 1.47)

(86) PCT No.: PCT/US2007/002713

§ 371 (c)(1), (2), (4) Date: Jul. 25, 2008

(87) PCT Pub. No.: WO2007/092243

PCT Pub. Date: Aug. 16, 2007

(65) Prior Publication Data

US 2009/0222996 A1 Sep. 10, 2009

Related U.S. Application Data

(60) Provisional application No. 60/764,861, filed on Feb. 2, 2006.

(51) Int. Cl.
*A47C 17/00* (2006.01)

(52) U.S. Cl. ............. 5/740; 5/730; 5/728; 5/731; 5/734; 5/953

(58) Field of Classification Search .............. 5/727, 730, 5/731, 740, 953, 655.9, 728, 694, 691, 732–736
See application file for complete search history.

(56) References Cited

U.S. PATENT DOCUMENTS

| | | | | |
|---|---|---|---|---|
| 4,665,573 | A | 5/1987 | Fiore | |
| 4,903,359 | A | 2/1990 | Rogers | |
| 5,398,354 | A | 3/1995 | Balonick et al. | |
| 6,842,927 | B2 * | 1/2005 | England | 5/739 |
| 7,051,389 | B2 * | 5/2006 | Wassilefky | 5/636 |
| 2005/0028289 | A1 | 2/2005 | Hakamiun | |
| 2005/0273941 | A1 * | 12/2005 | Stolpmann et al. | 5/727 |

OTHER PUBLICATIONS

International Search Report and Written Opinion in counterpart PCT application No. PCT/US07/02713, dated Nov. 19, 2007.

* cited by examiner

*Primary Examiner* — Jonathan Liu

(74) *Attorney, Agent, or Firm* — Chen Yoshimura LLP

(57) ABSTRACT

A foam core for a pressure reduction healthcare mattress is disclosed. It includes a top layer made of memory retention foam, a middle layer made of foam and having a convex shape that is higher along a longitudinal center line than along the two sides, and a lower support layer made of foam. The top layer is made of a torso piece and a softer foot/lower leg piece. The middle layer includes a heel pillow that fits into a heel pillow cavity in the foam, the heel pillow including layers of fiber material over a crown shaped foam insert. The lower support layer has a sloped portion in a lower leg section that slopes down toward a heel end of the foam core. Also disclosed is a pressure reduction healthcare mattress that includes the foam core and a cover.

10 Claims, 3 Drawing Sheets

1b 1a 1 21 2b 2 2a 3 3a 3b

3b
FIG. 3a
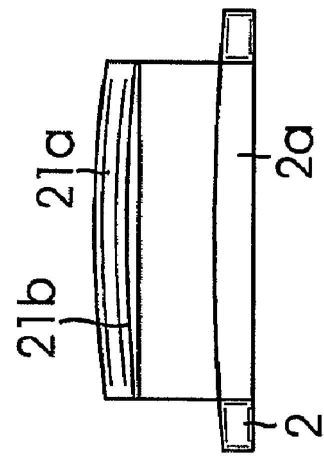
FIG. 3b
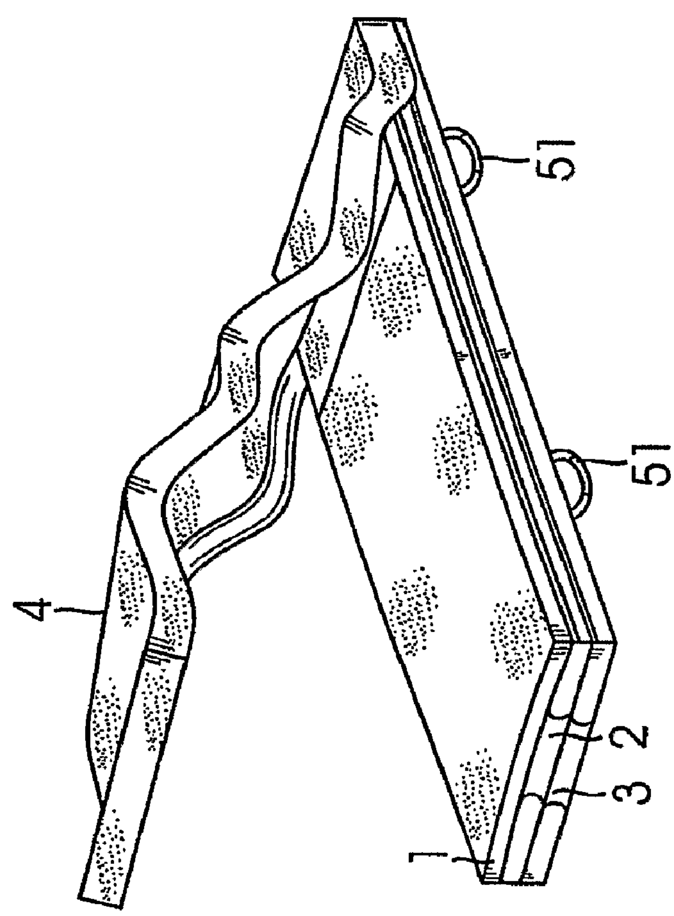
FIG. 2

PRESSURE REDUCTION HEALTHCARE MATTRESS SYSTEM

This application claims priority from U.S. Provisional Patent Application No. 60/764,861, filed Feb. 2, 2006, which is herein incorporated by reference in its entirety.

BACKGROUND OF THE INVENTION

1. Field of the Invention

This invention relates to healthcare mattresses, and in particular, it relates to a pressure reduction healthcare mattress system.

2. Description of the Related Art

New raw materials, chemical processes and ingredients used to manufacturer today's synthetic foam materials, have allowed the use of a greater variety of foams than used in the past. All foam, over a period of time, shows a slight body depression after use. Even the most expensive and luxurious chemically enhanced foams will demonstrate a slightly concave affect over time when used in a healthcare setting 24 hours a day. Heat, moisture and bed articulation affect the pores of the foam and therefore the hospital mattress.

Foam healthcare mattresses are manufactured with either flat or irregularly surfaced foams. Patients normally lay in place on a healthcare mattress, and after a period of time moisture and heat contribute to the foam particles losing part of its memory, thereby creating a slightly depressed area in the center of the healthcare mattress where most of the patient's weight is disbursed.

SUMMARY OF THE INVENTION

This invention addresses this "depression" problem by enhancing the foam core with an inherent minimal convex elevation to allow the foam to be more supportive to a hospital patient over longer period of time as compared to the life of expectancy of a conventionally flat constructed quality foam mattress.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a foam core for a pressure reduction healthcare mattress, which includes a top layer made of memory retention foam materials, a middle layer made of a foam material and having a convex shape that is higher along a longitudinal center line than along two longitudinal sides, and a lower support layer made of a foam material. The invention also provides a pressure reduction healthcare mattress having such a foam core.

It is to be understood that both the foregoing general description and the following detailed description are exemplary and explanatory and are intended to provide further explanation of the invention as claimed.

BRIEF DESCRIPTION OF THE DRAWINGS

FIG. 2 is a partially exploded perspective view of the mattress.

FIG. 3*a* illustrates a heel portion of the foam base of the foam core of FIG. 1.

FIG. 3*b* is a cross-sectional view of the heel portion of the middle layer of the foam core of FIG. 1.

DETAILED DESCRIPTION OF THE PREFERRED EMBODIMENTS

Figure 1:
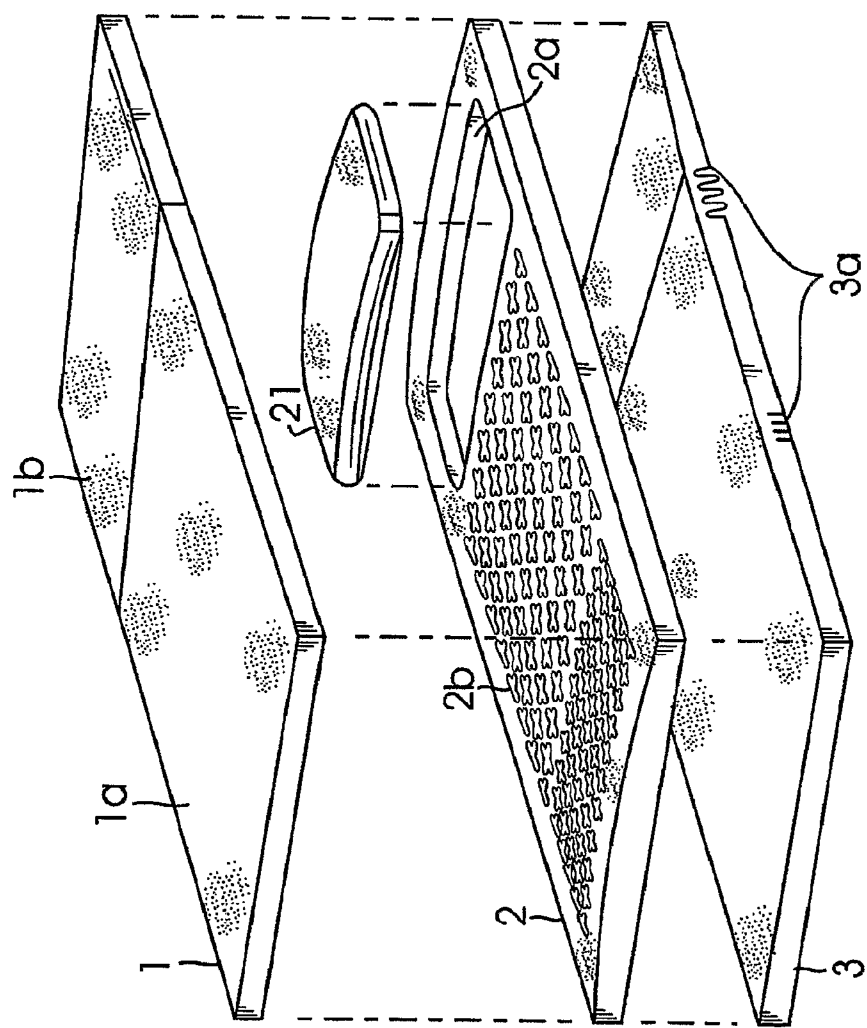
FIG. 1 is an exploded perspective view of the foam core of a mattress according to an embodiment of the present invention.

A pressure reduction mattress according to embodiments of the invention is described with reference to FIGS. 1 to 4*b*. The pressure reduction mattress is a tri-laminated mattress with a convex shaped, center support layer which has a lower profile at the edges and a slightly elevated profile throughout the body section of the mattress running from the head to the foot. Newly developed foams are memory friendly, and allow the patient to be engulfed and supported rather than having the patient fall into a hollow depression created over a period of time of 24 hour a day use. This construction also allows the pressure reduction mattress to be manufactured in a lower height, for example approximately 5" as compared to conventionally constructed healthcare mattresses which are normally manufactured between 6" to 7" in height. The lower profile of this pressure reduction mattress allows the patient to have easier ingress and egress to and from the bed when the bed is in a lower height. The lower profile of the pressure reduction mattress also increases the protection from the side rails of the bed, and offers some patients more protection in bed. Also, the integral, non-die cut internal side rail protection is approximately 2¾" in from the border, offering a more secure border for the patient as they sit on the side of the mattress.

As shown in FIGS. 1-3*c*, the foam core of the mattress has three foam layers. The top layer 1 is formed of two separate pieces of foam (preferably Visco Elastic memory retention foam), namely, a torso top layer 1*a* and a foot/lower leg section 1*b*. The top layer 1 is designed to cradle the patient's bony prominces. It compresses gently and is supported by a middle convex shaped resilient layer of foam 2. The two pieces of foam 1*a* and 1*b* are joined by a glue joint approximately 24" from the foot section of the foam core. The foot/lower leg portion 1*b* is preferably made of lower density (softer) Visco elastic memory retention foam in order to create the first layer of heel protection. The top layer of foam 1 is approximately 1" thick.

The middle or secondary support layer 2 is approximately 2" high along the two longitudinal sides and is slightly, gradually convex with an apex of approximately 2.25" along the longitudinal center line. This middle support layer 2 has three die shaped patterns. The first pattern has small die shaped "+" in the head section, and the second pattern has slightly wider and more open die cut "+" in the scapula through upper leg area. The third die shaped pattern is a heel pillow cavity 2*a* at the heel area of the middle support layer 2. The integral, non-die cut internal side rail protection 2*b* is approximately 2¾" in from the side border, offering a more secure border for the patient as they sit on the side of the mattress.

A heel pillow 21, which fits into the heel pillow cavity 2*a* of the middle layer 2, is a foam shimmed fiber pillow. It is manufactured with four layers of synthetic raw materials, and enclosed in a non-woven pillow shell which is sewn closed. As shown in FIG. 3*b*, the heel pillow 21 includes three layers of needle-punched polyester fiber 21*a* over a crown shaped foam insert 21*b*. Due to this construction, the heel pillow does not pack down as conventional institutional or home type pillows. It incorporates a wedge (approximately ¼" height at the center) of convex, contour cut foam 21*b* on the bottom of the three separate layers of polyester fiber padding in the pillow. Therefore, the pillow 21 follows the contour of the convex middle support layer 2 of foam in the core. The heel pillow 21 is the second address to the critical heel pressure problem which affects patients a healthcare environment.

The lower support layer 3, the foundation layer of foam in the foam core of this pressure relieving healthcare mattress, is approximately 2.25" in height. It is provided with articulation cuts 3*a* located at the head section articulation point as well as the knee section articulation point of the core. The foundation layer 3 also features a tapered slope section 3*b* which starts its taper from approximately 24" from the end of the foam base towards the heel section. The slope section 3*b* starts at approximately 2.25" high and is lowered to approximately 1.25" high at the foot section of the mattress. This forms the third layer of heels protection for the patient. Because of the slope section 3*b*, the overall height of the mattress has a downwardly sloped shape in the heel section.

Although various dimensions are described for the above embodiment, other suitable dimensions may be used, and the invention is not limited to the precise dimensions illustrated described herein.

As seen from the above descriptions, pressure reduction mattresses according to embodiments of the present invention have three desirable features in their design: (1) lower density top layer foam 1*b* at the heel section, (2) heel pillow 21 with a convex wedge, and (3) the slope 3*b* in the lower support layer. These features contribute to the pressure reduction properties of the mattress. Another feature illustrated in this drawing are the lateral cuts on the bottom surface of this third layer that facilitate the articulation of this firm layer and the completed mattress core.

Figure 4A:
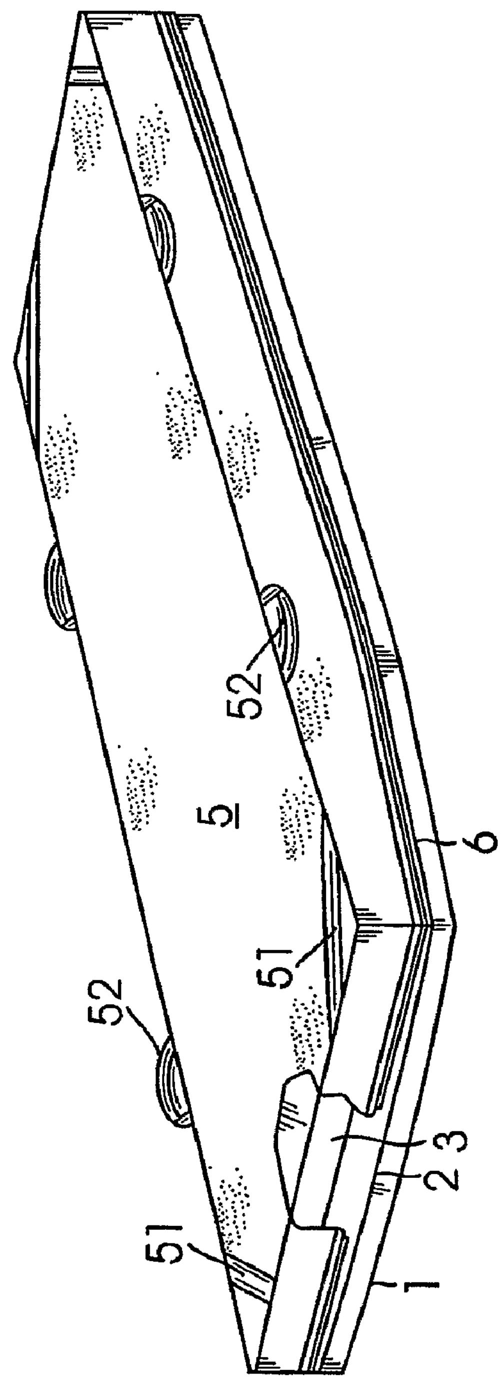
FIGS. 4*a*-4*b* are bottom perspective views of the mattress of FIG. 1.
Figure 4B:
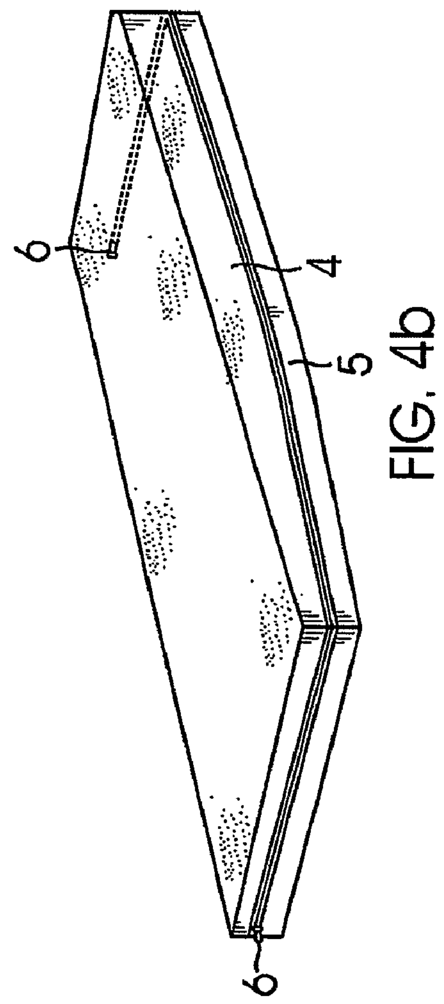

As shown in FIGS. 4*a* and 4*b*, the foam core is covered by a top cover 4, a bottom cover 5, and a zipper 6 (preferably a 270 degree zipper) connecting the top and bottom covers, forming a zippered waterproof covering system. The mattress also includes a linen lock 51 for sheet retention and carrying handles 52 on the bottom cover 5. Preferably, all foam is anti-microbial and meets normal flammability standards (e.g. California Technical Bulletin #117).

EXAMPLE

Table 1 below shows an example of a pressure reduction mattress according to embodiments of the present invention ("Embodiment"). It also compares the structures of the pressure reduction mattress to a conventional mattress ("comparison"). The mattress can be made with different dimensions such as 191×88.5×15.24 cm, 191×80.5×15.24 cm, or 191×75.5×15.24 cm.

TABLE 1

| | | Comparison | Embodiment |
|---|---|---|---|
| 1. | Top Cover | Hypolex Ultra Navy Blue rubber coated 70 Denier nylon with silkscreen print | ElastiMax 4-way stretch. Alternate: Hypolex nylon top cover (*detail listed below) |
| 2. | Bottom Cover | 11 oz. Dresden Blue vinyl bottom cover with handles and Linen Locks | DuraTuff II bottom cover with handles and Linen Locks (**detail listed below) |
| 3. | Zipper Assembly | Separating 360° YKK zipper with moisture proof flap | 270° spiral zipper connecting top and bottom cover with moisture proof flap |
| 4. | Foam Core - three layer construction | | |
| | Top Layer | 1.5" 2.4 21 HR | 1" 3 lbs. 15 ILD VE foam |
| | Heel Section | 1.8 11 HR | 1" 2.5 lb. 10 ILD VE foam |
| | Center | 2" 1.85 29 Polyurethane with die cuts and pillow die cut opening | 2" 1.85 35 ILD foam with ¼" crown and 2" side depth, three section die cuts with pillow die cut |
| | Bottom Layer | 2.5" 1.85 35 Polyurethane with articulation cuts | 2.25" 1.85 lb. 46 ILF foam with Heel Slope |
| | Heel Pillow | Three layer densified fiber | Three layer densified fiber with ¼" crowned foam insert on bottom of pillow |
| | Misc. | n/a | Polyurethane Flexskin inner liner |

*Top Cover - Cast-coat polyurethane film adhered to a 2 way stretch polyester knit substrate. The film includes flame retardant and anti-microbial additives. Weight is 5.4 oz/sq yd

**The bottom cover "DuraTuff" is a 300 × 600 denier polyester woven fabric with a .55 mm PVC coating on the back. This fabric also includes flame retardant and anti-microbial treatment. Weight is 13.5 oz/sq yd.

Test Results

The inventors have obtained and compared pressure maps obtained using a mattress according to an embodiment of the present invention and a conventional mattress. From the pressure maps of test objects using a mattress according to an embodiment of the present invention and a conventional mattress, it was observed that the mattress according to the embodiment of the present invention reduces pressure on the test objects.

It will be apparent to those skilled in the art that various modification and variations can be made in the pressure reduction healthcare mattress of the present invention without departing from the spirit or scope of the invention. Thus, it is intended that the present invention cover modifications and variations that come within the scope of the appended claims and their equivalents.

What is claimed is:

1. A foam core for a pressure reduction healthcare mattress, comprising:

a top layer made of memory retention foam materials and having a uniform thickness;

a middle layer located immediately below the top layer, made of a foam material and having a convex shape that is higher along a longitudinal center line than along two longitudinal sides, wherein the top layer has a shape conforming to the convex shape of the middle layer; and a lower support layer located immediately below the middle layer and made of a foam material, wherein the lower support layer defines a sloped portion in a lower leg section that slopes down toward a heel end of the foam core.

2. The foam core of claim 1, wherein the top layer is made of first and second pieces of memory retention foam materials connected together, the first piece being located in a torso section and the second piece being located in a foot and lower leg section of the foam core, the second piece of foam having a lower density than the first piece.

3. The foam core of claim 1, wherein the middle layer define a first die shaped pattern having small die shaped "+" in a head section and a second die shaped pattern having wider and more open die cut "+" in a scapula through upper leg section of the foam core.

4. The foam core of claim 3, wherein the middle layer has an integral, non-die cut internal side rail portion along each side border of the foam core.

5. The foam core of claim 3, wherein the middle layer further defines a heel pillow cavity in a heel section of the foam core.

6. The foam core of claim 5, further comprising a heel pillow that fits into the heel pillow cavity.

7. The foam core of claim 6, wherein the heel pillow comprises one or more layers of fiber material and a foam insert under the fiber material, the foam insert having a convex shape that is higher along a longitudinal center line than along two longitudinal sides.

8. A pressure reduction healthcare mattress comprising the foam core of claim 1 and a cover for covering the foam core.

9. A foam core for a pressure reduction healthcare mattress, comprising:

a top layer having a uniform thickness and made of first and second pieces of memory retention foam materials connected together, the first piece being located in a torso section and the second piece being located in a foot and lower leg section of the foam core, the second piece of foam having a lower density than the first piece;

a middle layer located immediately below the top layer, made of a foam material and having a convex shape that is higher along a longitudinal center line than along two longitudinal sides, wherein the top layer has a shape conforming to the convex shape of the middle layer, the middle layer defining a heel pillow cavity in a heel section of the foam core;

a heel pillow that fits into the heel pillow cavity, the heel pillow comprises one or more layers of fiber material and a foam insert under the fiber material; and a lower support layer located immediately below the middle layer and made of a foam material, the lower support layer defining a sloped portion in a lower leg section that slopes down toward a heel end of the foam core.

10. A pressure reduction healthcare mattress comprising the foam core of claim 9 and a cover for covering the foam core.

* * * * *